Patented Oct. 29, 1946

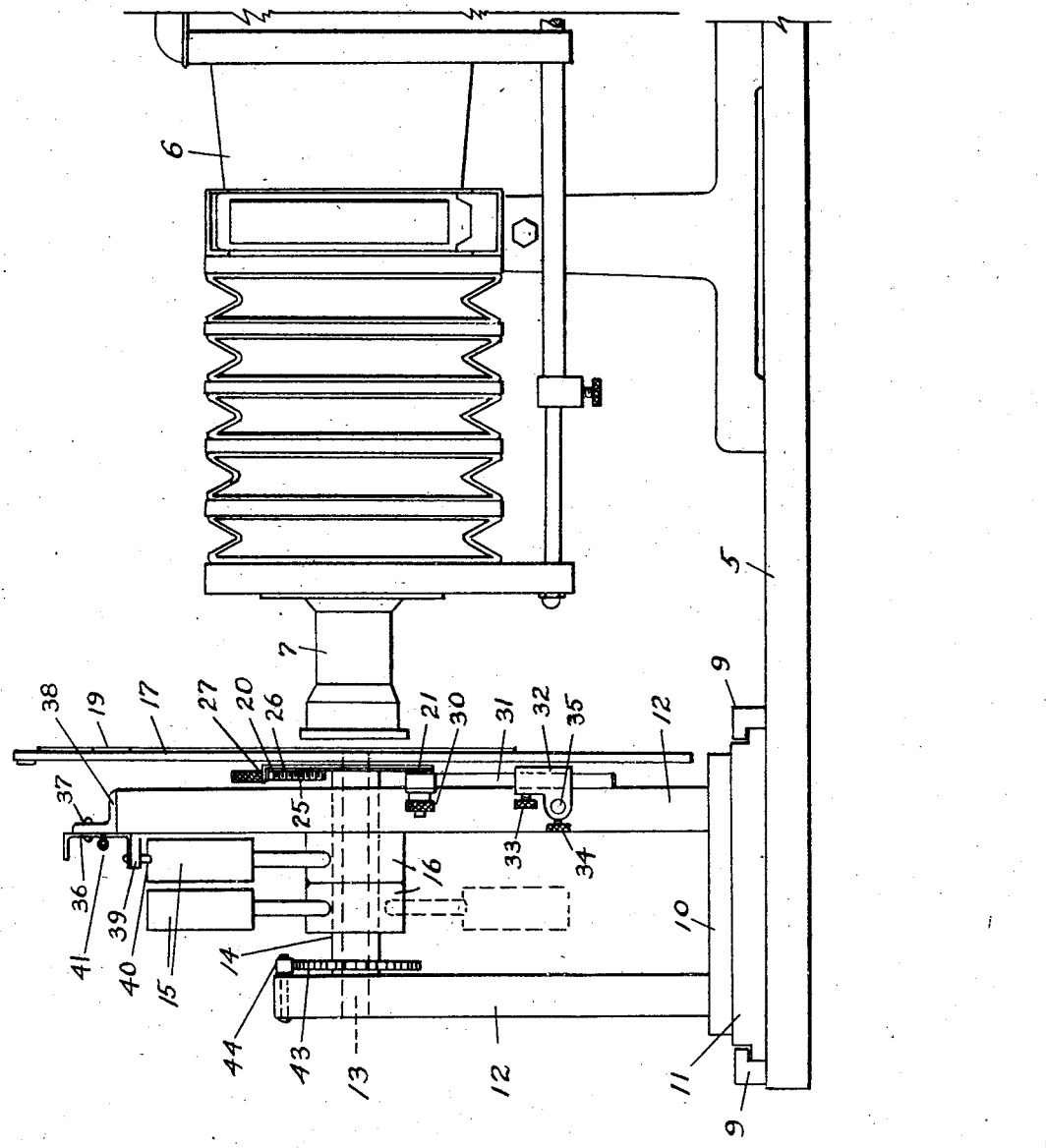

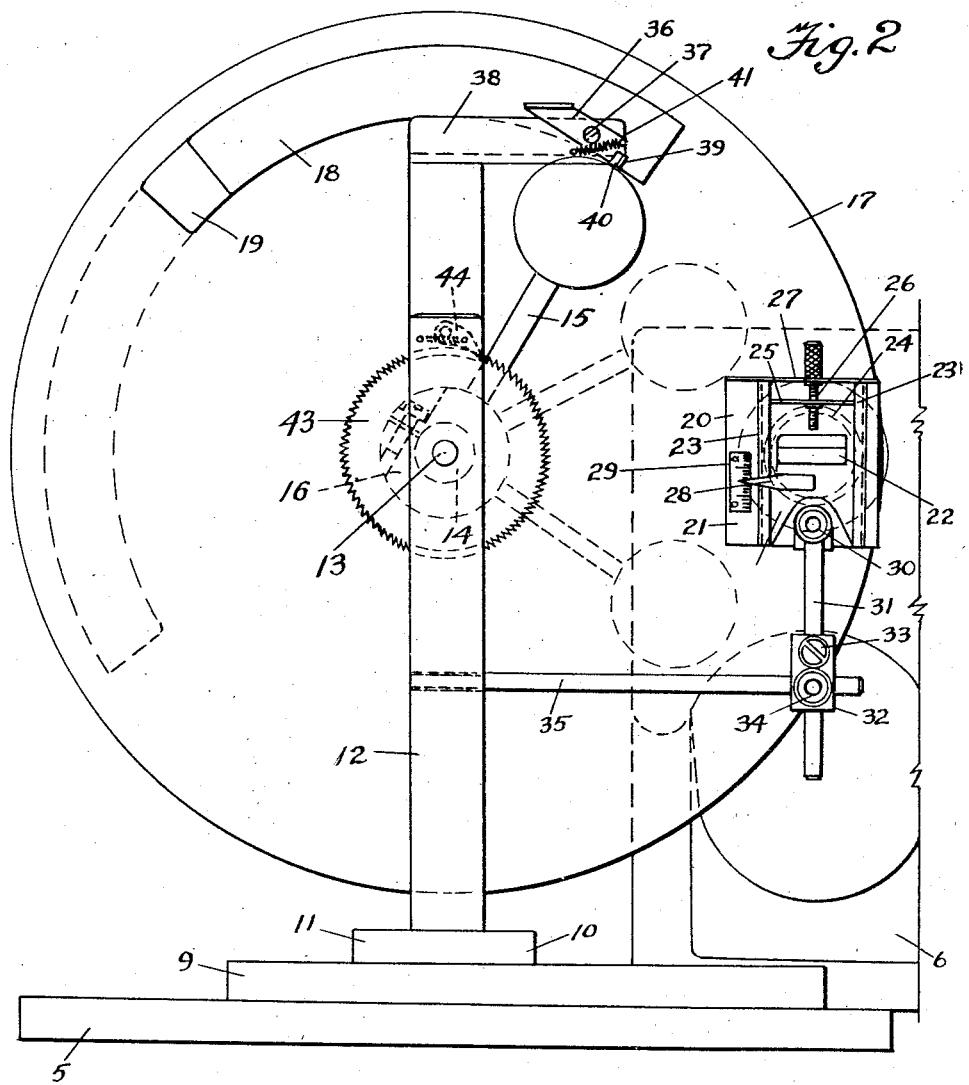

2,410,237

UNITED STATES PATENT OFFICE 2,410,237

TACHISTOSCOPIC APPARATUS

Samuel Renshaw, Columbus, Ohio

Application April 6, 1944, Serial No. 529,789

5 Claims. (Cl. 88—20)

This invention relates to light-projecting apparatus, and has particular reference to apparatus for controlling the duration in point of time of light undergoing projection on a screen or other target.

Such apparatus is known as tachistoscopes or episkotisters, depending somewhat on their details of construction. In prior apparatus, such shutters, episkotisters and exposure devices are often so made as to open from the center and admit increasing light radially to the periphery, and on closing to reverse this process. Their operation often is such as to induce a type of apparent movement in the image or light pattern projected on the screen, known as gamma movement. Apparently this is due to dilation and contraction of the iris and is detrimental to clear perception of forms in visual training work in which tachistoscopic exposures are used to produce greater coherence, speed and accuracy in the perception of any form, symbol, drawing, photograph or other image forming the projected light pattern.

It is, therefore, an object of the present invention to provide improved tachistoscopic apparatus wherein the projected light is controlled to provide an exposure pattern free from the disturbing effect of gamma movement.

It is another object of the invention to provide tachistoscopic apparatus having a rotatably supported disk-like shutter having a segmental, variable area, light aperture formed adjacent to its periphery, and wherein improved means are provided for rotating the shutter so that the aperture thereof, for a predetermined interval of time, will be brought into registration with a projected beam or sheaf of light, so that the light may be cast on a screen or target for a regulable interval of time.

It is another object of the invention to so shape and position the shutter aperture, so that as the shutter is rotated at a predetermined rate of speed, the leading marginal edge of the aperture causes the projected light image to appear upon a screen in clear integral form and at virtually full brilliance in a very small increment of shutter travel, so that its form at the onset and cessation of the exposure, is clear and sharp throughout substantially the full period of exposure and devoid of gamma movement previously described.

It is a further object of the invention to so form and arrange the light aperture in the rotating shutter disk as to admit the light ray sheaf to the screen from bottom to top of the screen image as viewed, since when the reverse direction is used, disturbing pursuit movements of the eyes are often instigated and these are in a direction contrary to normal effective eye posture, convergence and accommodation.

Another important object of the invention is to provide improved means for effecting the rotation of the shutter disk at desired rates of speed, the said means comprising a plurality of relatively adjustable weighted pendulums so arranged and connected with the shutter disk that when the latter is released, the pendulums will turn gravitationally and revolve with them the shutter disk, thus avoiding the use of springs, solenoids, magnets and motors to rotate the disk and simplifying the mechanical structure of the apparatus.

Still a further object of the invention is to provide a tachistoscope of the character indicated embodying a base frame for the support of the rotary shutter disk, and wherein the frame is equipped with a normally stationary but adjustable shutter having a variable light aperture so disposed as to register with the aperture of the disk when the latter is turning between its starting and stopping positions.

For a further understanding of the invention, reference is to be had to the following description and the accompanying drawings, wherein:

Fig. 1 is a side elevational view of tachistoscopic apparatus formed in accordance with the present invention;

Fig. 2 is a front elevational view thereof.

Referring more particularly to the drawings, the numeral 5 designates the base frame of my improved tachistoscope. Adapted to be mounted on this frame, or to be disposed adjacent thereto, is a light projector or stereopticon 6. The latter may be of any desired construction, and is adapted to receive slides, transparencies, photographs and other similar devices in order to project a light pattern from the lens barrel 7 thereof toward a screen or target 8.

In tests or demonstrations of the type adapted to develop faculties of accurate and quick visual perception on the part of observers, my improved tachistoscope is constructed normally to intercept light projected toward the screen or target, but for relatively short intervals to admit of such passage or projection, so that a light pattern or image of desired form may be viewed for periods of, for example, 0.75 to 0.0001, or less, part of a second. In attaining this end, the base 5 is provided with parallel guides 9 which, in connection with the base, provide for the guiding support of a bracket 10, the latter being formed with a base piece 11 from which extends upwardly a pair of fixed posts 12.

Carried by these posts is a stationary shaft 13 upon which is rotatably mounted a sleeve 14. Arranged for relative adjustment on the sleeve 14, and disposed between the posts 12, is a pair of pendulums or weighted arms 15, the hubs 16 of the latter having clamped or other similar adjustable engagement with the sleeve 14, so that the operating positions of the pendulums in connection with said sleeve may be adjusted with respect to each other to vary the speed of rotation of the sleeve 14.

Carried by one end of the sleeve 14 for rotation therewith is a shutter mask 17, preferably in the form of a disk. The diameter of this disk is such that its outer portion normally will intercept light projected from the barrel 7. The disk may be formed from any opaque or semi-opaque materials, such as metal or one or more of the so-called plastics. Adjacent to its periphery, the disk is provided with an arcuate slot, aperture or other light-transmitting region 18, whether perforate or imperforate, which, when the disk is rotated from a starting position, will be brought into registration with the lens barrel of the light projector, enabling a light pattern to be cast on the screen or target 8 for the interval of time permitted by the time allowed for the slot or aperture 18 to pass into or out of registration with the lens barrel.

The area of the slot, aperture or other light-transmitting region may be varied by means of an adjustable strip 19 carried in arcuate guides provided on one face of the disk. The strip 19 is of such length as to substantially completely close or cover the slot or aperture 18 when moved to one of its extreme positions of adjustment, or to fully open said slot or aperture when the strip occupies its opposite extreme position of adjustment.

Also, to control the light pattern, I provide a normally stationary but adjustable framing device or shutter 20. The latter comprises a vertically disposed opaque plate 21, mounted at the front of the disk so that an aperture 22 in said plate will register with the lens barrel 7 and the slot or aperture 18 of the disk 17 when the latter is rotated. To vary the height dimension of the aperture, the plate 21 is provided on its front surface with guides 23 which slidably receive for vertical adjustment a closure element 24. The upper edge of the element 24 is provided with a lip 25 having a threaded opening for the reception of the shank of an adjusting screw 26, the upper end of the latter being rotatably received in an opening provided in a flange 27 projecting laterally from the top of the plate 21. By manually turning the screw 26, the closure element may be raised or lowered to increase or decrease the effective height of the aperture 22. If desired, the element 24 may be provided with a pointer 28 movable over a graduated scale 29 disposed at one side of the plate 21, in order that the extent of adjustment of the closure element 24 may be accurately determined.

In order to provide for both lateral and vertical positioning adjustment of the frame-carried shutter, the bottom of the plate 21 thereof is connected, as at 30, with the upper end of a vertically depending rod 31. This rod is received within a vertical opening provided at one side of a collar 32. A thumb screw 33 is carried by the collar and its inner end engages frictionally with the rod 31 to maintain the rod and the plate 21 carried thereby in different positions of vertical adjustment. Also, the collar 32 is equipped with a second thumb screw 34, the inner end of which has frictional engagement with a horizontally disposed rod 35, so that the collar and the shutter frame may be adjusted horizontally and transversely of the apparatus, the inner end of the rod 35 being connected with one of the posts 12. Through these multiple adjustments, accurate registration of the light-passing apertures, and their effective light-transmitting proportions, is conveniently obtainable.

With the pendulums 15 set in the position shown in full lines in Fig. 2, the disk may be released for rotation by the actuation of a manual control. In the present instance, this control consists of a hand-operated lever 36, which is pivotally mounted as at 37 on an angle bracket 38 carried by the upper end of one of the posts 12. The lower end of the lever terminates in a laterally directed lip 39, which is disposed for engagement with a pin or stud 40 projecting outwardly from the weight element of the innermost pendulum. A light coil spring 41, connected at its ends with the lever 36 and the bracket 38, maintains the lip 39 in engagement with the pin or stud 40. By depressing the upper end of the lever 36, the latter may be rocked on its pivot to remove the lip 39 from contact with the pin or stud 40, thereby releasing the pendulums and, through gravitational action, causing the same to rotate. Such rotation revolves the sleeve 14 and the disk 17, bringing the light aperture of the disk into registration with the lens barrel of the light projector and also that of the frame-carried shutter 20, producing an exposure of a projected pattern of light for a determinable interval of time. By changing the operating position of the outermost of said pendulums with respect to the innermost, as shown by dotted lines in Fig. 2, the speed of rotation of the disk may be varied.

The pendulums effect turning movement of the disk until reengagement of the pin or stud 40 with the lip 39 of the lever 36 again takes place, it being understood that when the lever is actuated to release the pendulums, manual pressure thereon is removed so that the normal position of the lever, in response to the action of the spring 41, is obtained. The sleeve 14, at its outer end may be provided with a fine toothed ratchet wheel 43, with which is engaged a pivoted spring actuated pawl 44 carried by the outermost of the posts 12, the ratchet wheel and pawl serving to prevent reverse rotation of the disk 17.

In view of the foregoing, it will be seen that the present invention provides a tachistoscope or episkotister in which the primary shutter, provided by the disk 17, is mounted for controlled rotation in a vertical plane. The power for effecting the operation of this disk is not derived from springs, solenoids, magnets or motors, and in lieu thereof the variable pendulum structure set forth provides a reliable, readily varied and simple means for rotataing the disk. When the two bobs of the pendulum are aligned in the full line position shown in Fig. 2, the speed of rotation of the disk is at a maximum. If the bob of one of the pendulums is placed in one or the other of the dotted line positions disclosed in Fig. 2, the effect is to reduce its compensating action and decrease disk speed. The ratchet and pawl mounted in connection with the disk spindle provide an effective and automatic stop at the point of maximum excursion and prevent re-exposure from back swinging of the pendulum.

If desired, the disk 17 may be formed from translucent materials to provide for low intensity illumination of the screen before the aperture 18 therein registers with the light projecting means. When this registration occurs, full intensity or brilliant illumination of the screen substantially immediately takes place. Since the leading edge of the aperture 18 is moving downwardly at the time of full intensity illumination, the light pattern so produced has a natural quality, free from the disturbing effect of gamma movement as, heretofore, has been so often present in apparatus of this nature. My apparatus finds considerable use in the training of military students to identify quickly various types of airplanes, naval vessels and the like. It is also used for various methods of visual training by ophthalmologists, optometrists, psychologists and others, in which any target, symbol or image may be viewed in controlled exposures by admitting light from such target, symbol or image to the eye or eyes of the observer, either reflected from or transmitted through such object, transparency, drawing, photograph or target image.

Suitable prisms, interposed between the eyes of the observer and the target, make the device adaptable as a stereo-tachistoscope, and by means of which stereoscopic, vectographic and other optical means of three-dimensional stimulus patterns can be delivered to the eyes of an observer as in methods of eye training and visual rehabilitation.

By the term "gamma movement," as used in the specification and claims thereof, I refer to the visual phenomenon which occurs when a light patch of an area greater than a certain minimum, and of sufficient angular subtend at the eye, is seen for a period of short duration, and wherein the apparent distribution of light through the field following the onset possesses an iris-like movement of dilation from the center of the field peripherally on all radial axes, and upon cessation of illumination, a restriction toward the center of the field.

I claim:

1. In a tachistoscope, a base frame, a rotatable shutter on said frame having a peripherally located light-transmitting region adapted for registration with a light sheaf projected from an associated light source, a member on said frame rotatable axially with said shutter, means for rotating said shutter at variable rates of speed embodying a pair of pendulum arms having their inner ends arranged in longitudinally aligned order on said rotatable member, and means for adjustably securing the inner ends of said arms to the rotatable member to vary arcuately the spacing thereof.

2. In a tachistoscope, a base frame, a rotatable shutter on said frame having a peripherally located light-transmitting region adapted for registration with a light sheaf projected from an associated light source, a member on said frame rotatable axially with said shutter, means for rotating said shutter at variable rates of speed embodying a pair of pendulum arms having their inner ends arranged in longitudinally aligned order on said rotatable member, means for adjustably securing the inner ends of said arms to the rotatable member to vary arcuately the spacing thereof, and a manually operated control adapted when released to enable said arms through gravity response to swing downwardly, thereby rotating said shutter and axial member in unison therewith.

3. In a tachistoscope, a base frame, a rotatable shutter on said frame having a peripherally located light-transmitting region adapted for registration with a light sheaf projected from an associated light source, a member on said frame rotatable axially with said shutter, means for rotating said shutter at variable rates of speed embodying a pair of pendulum arms having their inner ends arranged in longitudinally aligned order on said rotatable member, means for adjustably securing the inner ends of said arms to the rotatable member to vary arcuately the spacing thereof, a manually operated control adapted when released to enable said arms through gravity response to swing downwardly, thereby rotating said shutter and axial member in unison therewith, and pawl and ratchet mechanism limiting said shutter to rotation in a single direction.

4. In a tachistoscope, a frame, a rotatable shutter mounted on said frame, said shutter having a peripherally located light-transmitting aperture adapted for registration upon, rotation of said shutter, with a light sheaf projected from an associated light source, a pair of arcuately adjustable radially extending arms having weighted outer ends, said arms being mounted in axial connection with said shutter and operative when released to cause rotation of the latter at predetermined but variable rates of speed depending upon the arcuate spacing between said arms, and manually-actuated means normally holding said arms against rotation but operative when actuated to release said arms to admit of downward turning movement of the latter and said shutter in unison therewith.

5. In a tachistoscope, a base frame, a rotatable shutter mounted on said frame, said shutter having a peripherally located light-transmitting region adapted for registration with a light sheaf projected from an associated light source, gravity responsive arcuately adjustable off-center weight devices cooperative with said shutter for rotating the same, means limiting said shutter for rotation in but one direction, control means operable when released to admit of turning movement of said shutter in unison with said weight devices, a framing member having a light-transmitting aperture, an adjustable support for said framing member governing the registration of the aperture therein with the light sheaf projected from said source, and an adjustable plate carried by said framing member for varying the effective area of the light aperture therein.

SAMUEL RENSHAW.